(12) United States Patent
Fritsch et al.

(10) Patent No.: US 8,754,927 B2
(45) Date of Patent: Jun. 17, 2014

(54) VIDEO DISPLAY SCREEN WITH CAMERA POSITION OPTIMIZED FOR VIDEO CONFERENCING

(76) Inventors: Bernhard Fritsch, Malibu, CA (US); Ted Sabety, New York, NY (US)

( * ) Notice: Subject to any disclaimer, the term of this patent is extended or adjusted under 35 U.S.C. 154(b) by 288 days.

(21) Appl. No.: 13/286,379

(22) Filed: Nov. 1, 2011

(65) Prior Publication Data

US 2013/0106983 A1 May 2, 2013

(51) Int. Cl.
 *H04N 7/14* (2006.01)
(52) U.S. Cl.
 USPC ..................................... 348/14.16; 348/14.08

(58) Field of Classification Search
 USPC .............. 348/14.01, 14.08, 14.16; 379/93.21, 379/158, 202.01, 93.12
 See application file for complete search history.

(56) References Cited

U.S. PATENT DOCUMENTS 5,550,754 A * 8/1996 McNelley et al. .......... 348/14.01
2012/0249724 A1 * 10/2012 Morrison .................... 348/14.16

* cited by examiner

*Primary Examiner* — Olisa Anwah
(74) *Attorney, Agent, or Firm* — Sabety + Associates PLLC

(57) ABSTRACT

A video display device adapted for video conferencing where a camera is placed in the line of sight of the screen. If both users of a video conference are using this device, they will look straight at each other and one will appear to be looking directly into the other's face.

17 Claims, 4 Drawing Sheets

VIDEO DISPLAY SCREEN WITH CAMERA POSITION OPTIMIZED FOR VIDEO CONFERENCING

SUMMARY OF THE INVENTION

It is common for laptop computers, tablet computers, smart phone computers and other computer devices that have a video display capability to have an image sensing device, or camera built into the computer device. Typically, the camera occupies a position on the chassis of the device that is peripheral to the video display screen. This makes it not fully practical for video conferencing purposes. As a result of the camera being at the periphery of the screen, the screen displays the other person's face, but the camera is showing that thee from a position above that person's line of sight. That is because the other person is looking at the screen, not at the camera. The result is that when the device is used for video conferencing, the participants in the conference do not seem to be looking straight at the other participants. This affects the subliminal psychological cues associated with normal in-person conversations and as a result, makes video conferencing not fully natural. This invention makes it possible to avoid this problem.

In this invention a camera is placed in the line of sight of the viewing screen so that a video conferencing user can simultaneously look squarely into the face of the other participant at the same time as looking straight into the camera. When both participants in a video conference are using a device equipped with the invention, the result is a very natural conversation. When one of the participants is using the device, the result is still a great improvement over the prior art.

DETAILED DESCRIPTION OF THE PREFERRED EMBODIMENTS

There are a number of ways the video camera may be placed in the middle of the computer display screen line of sight. In a first embodiment, the camera is mounted to an adjustable support that has a clip or other mechanical attachment to the chassis of the video display device. The clip (3) attaches the support arm (1) to the top and center of the computer video display (4) and then the arm hangs down toward the center of the screen. (2) The length of the arm is adjusted so that the camera is at the approximate center point of the screen. The arm can have a pivot (3) so that while the clip stays in place, the arm can be moved away from the screen when not in use. In a variation on this embodiment, the clip could attach to the side or bottom of the display screen. Practitioners of ordinary skill will recognize that a "computer video display" may also be a television set or other video display device that is utilized for video conferencing purposes. The external camera that is clipped to the display screen can be operatively connected to the computer in order to pass image data to the computer in typical ways, including USB port, Fire Wire, parallel port, Ethernet or any other way of attaching the output of the light collection device to a computer interface.

Figure 1:
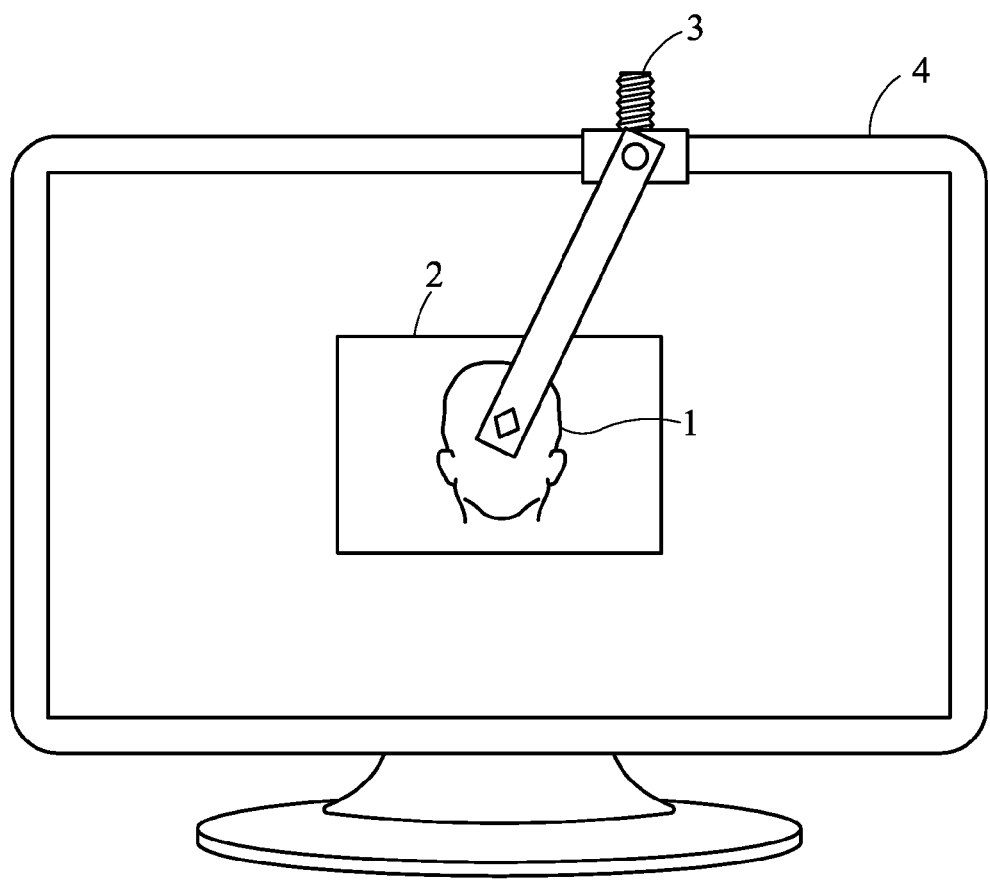
FIG. 1: Computer display with a clip, support arm and camera device.
Figure 2:
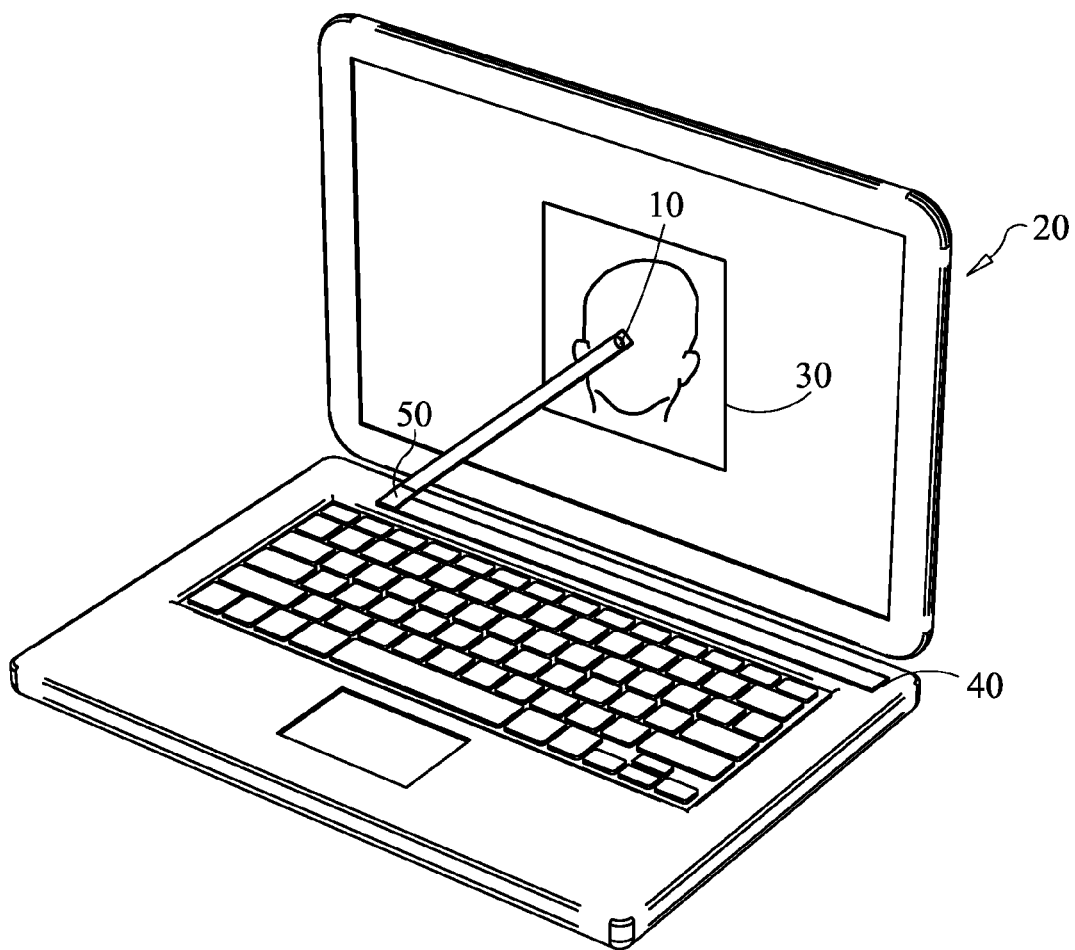
FIG. 2: Laptop computer with a stowable camera support arm.
Figure 3:
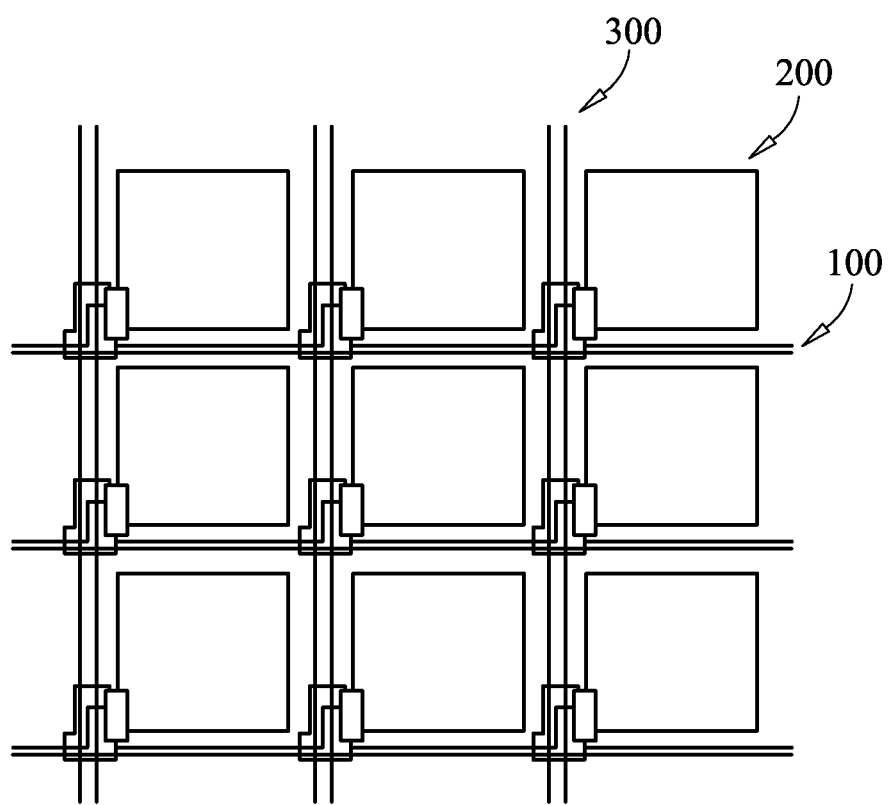
FIG. 3: LCD screen close-up showing pixels and control lines
Figure 4:
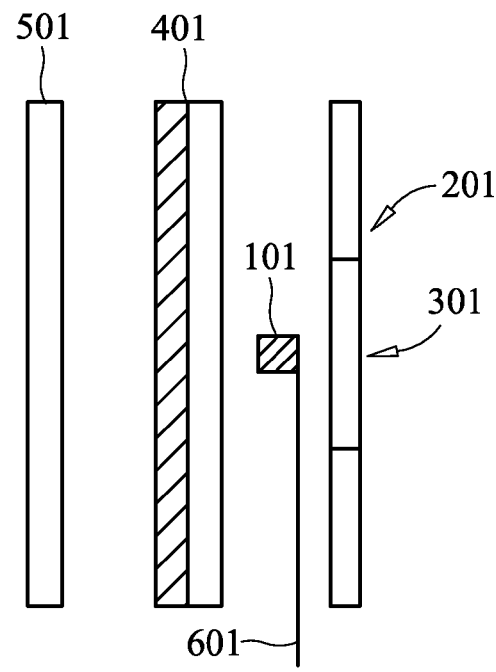
FIG. 4: LCD screen cross section showing backlight and camera position

In a second embodiment, a support arm (50) comprising the camera at one end (10) is attached at the other end to a hinge embedded in the chassis of a laptop computer, as shown in FIG. 1 (50). When the user wants to use the invention, the support arm can be lifted into position by elevating the first end of the support arm and rotating the arm about the hinge on the second end. The hinge may be any kind of pivoting bearing the length of the support arm will generally be the distance from the second hinge to the center of the laptop display screen (30). In this embodiment, the movable arm can be stowed in a slot (40) so that it does not detract from the utility of the display screen in other operational contexts.

Where the "center of the screen" is explained, in other embodiments could also be the "center of a display window on the screen". That is because so long as the camera is at the center of the line of site to the other user's face, the apparent result is the same. On larger display screens, the computer user may cause the computer system to open a virtual window that is smaller than the physical screen size and position that window arbitrarily in the area of the physical screen. For example, a user may put the video conferencing window in the lower left of the screen in order to open another virtual window that displays a document to the right of that. But so long as the camera is at the center of that virtual window presenting the other user's face, the improved result will be the same because the user will be looking squarely at the other user's face while looking directly into the camera. Embodiments of the invention include using a flexible support arm, that is, rather than using a stiff piece of plastic or metal, to use a flexible material. One end of the flexible support may be fixed to the device chassis without a hinge or pivoting bearing and thereby permitting the user to adjust the position of the camera by means of manipulating the flexible support arm.

Figure 5:
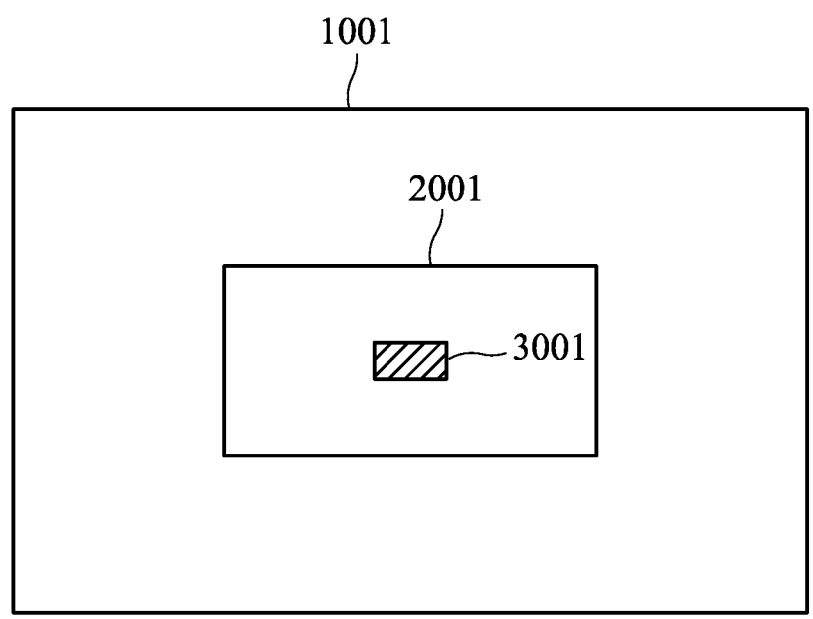
FIG. 5: Front view of backlight with camera.

In yet another embodiment, the camera is manufactured to be embedded in the middle of the computer display screen. The typical LCD screen is an array of pixels (200) controlled by signal lines for the x and y axis, respectively (300), (100). In one embodiment, the invention is embedded in a back-lit LCD display, where there is a backlight (201), (301) and a set of operative layers comprising the active matrix layer (401) and a transparent conductive layer (501). The camera (101) resides behind the operative layers of the LCD screen (401), (501) but in front of the backlight. (201). The camera sensor is attached to electronics using wires that may be embedded on the surface of the backlight (601) or if there is a hole in the backlight, passed through to the back of the backlight. In one embodiment, the light source is devised so that portion of the light source surrounding the camera can be separately addressed and turned off. (301). FIG. 5 shows a front-view of the light source, (1001) with the separately addressed region (2001) and the camera (3001). When the region (2001) is turned off, the camera (3001) will collect light coming back through the LCD panel the other way. This is accomplished by preferentially selecting the gate and data line grid so that a plurality of pixel electrodes are continuously set to transmit light. In this embodiment, control logic in the computer can override the video data signals arriving at the x address line (300) and the y address line (100) and instead drive them to a state that causes the selected pixels (200) to be transparent. In another embodiment, the software driver operated by the computer overrides the video data stream intended for the display in order to set the appropriate region of the screen to be transparent.

In yet another embodiment, the imaging device is integrated with the backlight assembly. In this embodiment, the backlight is fabricated so that it has a minute hole in the middle of the screen area. The imaging device occupies that hole, either by being embedded in the backlight assembly or by laying behind the backlight assembly and situated so that light passing back through the hole enters the active optical path of the camera. In other embodiments, the imaging device is comprised of a mirror or fiber optic connection can route light from the hole in the backlight and a camera that whose optical path receives the light from the mirror or fiber optic connector. The camera component of the imaging device can then be arranged in any position relative to the backlight. Light entering the hole will pass through using the mirror or fiber optic connection to the camera placed in an arbitrary position relative to the light path through the hole.

Given that even color LCD screens transmit white light, the light coming back through the LCD screen into the camera should be by and large, white. This will occur so long as each pixel for the color filter element, e.g. the Red, Green and Blue are all transparent for the selected pixels. At the camera, the three color components will together effectively pass white light through. This is demonstrable because the reverse is true: a white backlight looks like a white screen even though the light is passing through separate Red, Green and Blue pixels.

Nonetheless, by traversing through layers of the transparent conductive layers and the liquid crystal layer itself as well as glass, there may be spectral losses and overall light intensity loss. These can be made up for by devoting a larger number of pixels to the camera, and having a larger camera sensor. The microprocessor that receives data from the camera and works with the camera image data can apply amplification and apply color filtering in the digital domain to compensate for the color biasing that is inherent in the materials that the light passes through. Increased noise resulting from amplification of the camera signal can be reduced by utilizing typical digital signal processing techniques that are optimized for displaying a face that is close to the camera.

In yet another embodiment, the imaging device may be integrated into the operative layers of the video display screen. In this embodiment, the glass layer behind the active matrix (401) can be shaped in its cross section to produce a lens at one region of its surface. A CCD device can be fabricated on the glass behind the lensing area. In this way, the CCD will act as a camera for light passing through the LCD screen from the outside. Furthermore, the Red Green and Blue pixels can provide color filtering to each of the CCD pixels, further improving the CCD image quality. In the reverse, the light from the backlight can scatter through the CCD device when the screen is not being used for video conferencing.

What is claimed:

1. A video display device equipped for video conferencing comprising an imaging device whose input optical path coincides with an operative region of the video display surface where the imaging device is a camera attached at to one end of a supporting member with two ends, and the second end of the supporting member being mechanically attached to the equipment chassis housing the video display device where the camera is positioned in front of the video display surface in order that the light path from the user to the camera does not pass through the video display surface on the way into the camera.

2. The video display device of claim 1 where the second end of the supporting member is hinged so as to allow radial articulation of the camera position.

3. The video display device of claim 2 where the video display device is integrated into a computer chassis and the supporting member is attached to the chassis and is moveable using the hinge to adjust the position of the camera.

4. The video display device of claim 1 where the computer chassis is comprised of a recessed region accessible from the user's side of the chassis surface and located substantially at one extreme of the range of motion of the articulated supporting member that will permit stowing the supporting member and the camera in the recessed region of the chassis in that substantially extreme position.

5. A video display device equipped for video conferencing comprising an imaging device whose input optical path coincides with an operative region of the video display surface, comprising:

a surface with a plurality of pixels distributed over the surface, and a subset of said plurality of pixels within a pre-defined region of the surface, each subset pixel within the pre-defined region being controllable to be selectively substantially transparent as a group; and an image detection device with an optical input path, said path positioned to be operatively aligned with the predetermined region of substantially transparent pixels.

6. The video display screen of claim 5 further comprising a logic circuit operatively connected to data control lines that control the subset of pixels that, when operative, cause the data lines to be driven to a state that causes the subset pixels to attain the substantially transparent condition.

7. The video display screen of claim 5 further comprising a microprocessor adapted to control the subset of pixels in order to cause the subset to be transparent when the imaging device is being used.

8. The video display screen of claim 5 further comprising a set of operative layers of the screen and a backlight, where the imaging device is situated between the backlight and the operative layers of the screen.

9. The video display screen of claim 5 further comprising an operative layer of the screen and a backlight, where the backlight has a hole through it, approximately perpendicular to the surface of the backlight and centered within the predetermined region.

10. The video display screen of claim 9 where the optical input path of the imaging device is optically connected to the hole.

11. The video display screen of claim 10 where the optical connection is established by one of: at least one mirror or at least one fiber optic device.

12. The video display screen of claim 5 where the camera is operatively connected to a computer adapted to receive video data from the camera and further adapted to process such received data to compensate for any color bias resulting from light passing through the display device layers into the camera.

13. The video display screen of claim 5 where the camera is operatively connected to a computer adapted to receive video data from the camera and further adapted to process such received data to reduce the apparent image noise in the video data.

14. The video display screen of claim 1 where the point of attachment is a pivot.

15. The video display screen of claim 1 where the support arm is comprised of a flexible but stiff material that can be manipulated in more than one degree of freedom to position the camera.

16. The video display screen of claim 5 where the image detection device is a CCD.

17. The video display screen of claim 5 where the image detection device is fabricated on a transparent insulating layer of the operative layers comprising the video display device.

\* \* \* \* \*